(12) United States Patent
Stutz et al.

(10) Patent No.: US 8,267,410 B1
(45) Date of Patent: Sep. 18, 2012

(54) LIFTABLE RAMP TRAILER

(76) Inventors: Michael S. Stutz, Union, MI (US); John Slayter, Elkhart, IN (US)

(*) Notice: Subject to any disclaimer, the term of this patent is extended or adjusted under 35 U.S.C. 154(b) by 214 days.

(21) Appl. No.: 12/753,661

(22) Filed: Apr. 2, 2010

(51) Int. Cl.
*B60G 17/005* (2006.01)

(52) U.S. Cl. .................. 280/6.151; 280/83; 280/43.23; 414/476; 414/495; 414/484

(58) Field of Classification Search .............. 280/6.151, 280/402, 83, 6.15, 414.5, 43.23; 414/474, 414/476, 484, 485, 482, 495
See application file for complete search history.

(56) References Cited

U.S. PATENT DOCUMENTS

| | | | | |
|---|---|---|---|---|
| 2,753,064 A * | 7/1956 | Lesser | ............................ | 414/475 |
| 2,919,825 A | 1/1960 | Hornsby | | |
| 2,934,228 A * | 4/1960 | Hillberg | ........................ | 414/458 |
| 2,990,966 A | 7/1961 | Schramm | | |
| 3,240,506 A * | 3/1966 | McMullen | ................ | 280/43.23 |
| 3,335,887 A * | 8/1967 | Snook | ........................... | 414/476 |
| 3,764,031 A | 10/1973 | Parsen | | |
| 3,784,218 A * | 1/1974 | Stone | ........................ | 280/43.23 |
| 4,290,733 A * | 9/1981 | Lahman | ........................ | 414/476 |
| 4,372,572 A * | 2/1983 | Verschage | .................. | 280/441.2 |
| 4,900,055 A * | 2/1990 | Wright | ........................ | 280/6.15 |
| 5,090,718 A | 2/1992 | Kauffman | | |
| 5,161,814 A * | 11/1992 | Walker | ........................ | 280/414.5 |
| 5,195,764 A | 3/1993 | Schantz et al. | | |
| 5,887,880 A * | 3/1999 | Mullican et al. | ........... | 280/43.18 |
| 5,975,828 A | 11/1999 | Weldy | | |
| 6,135,700 A * | 10/2000 | Collins | ........................ | 414/476 |
| 6,592,139 B1 * | 7/2003 | Shanahan | .................. | 280/414.5 |
| 7,537,219 B1 * | 5/2009 | Sherwood | .................. | 280/6.151 |
| 7,618,227 B2 * | 11/2009 | Smith | ........................... | 414/484 |
| 7,736,115 B2 * | 6/2010 | Lambert | ........................ | 414/474 |

* cited by examiner

*Primary Examiner* — Faye M Fleming
*Assistant Examiner* — Karen A Beck
(74) *Attorney, Agent, or Firm* — Botkin & Hall, LLP

(57) ABSTRACT

A suspension for a trailer vehicle that allows the trailer itself to be used as a ramp. The suspension has an axle having an axis and wheels at each end of the axle. The axle is pivotally connected to the vehicle at a pivotal connection and the axis of the axle is offset from the pivotal connection to the vehicle. An actuation device having a first and second end is pivotally connected to the axle at its first end. The actuation device is movable between a retracted length and extended length. Shifting the actuation device between its retracted and extended lengths causes the axle to pivot about the pivotal connection on the trailer, thereby changing the height of the vehicle relative to the ground surface. The trailer can be used as a ramp, thus, eliminating the need for separate ramps.

7 Claims, 11 Drawing Sheets

LIFTABLE RAMP TRAILER

BACKGROUND OF THE INVENTION

Trailers for hauling equipment are frequently equipped with ramps, but even so, these trailers remain inadequate. The ramps are sometimes hinged to the trailer itself, thus wasting space on the trailer when the ramps are folded up. Other ramps are separate pieces that are moved into placed when being used to load the trailer, then must be stowed on the trailer. In either case, the ramps waste space on the trailer. Typically the weight and unwieldy nature of the ramps makes them difficult to use.

Another difficulty of the ramps is their steep angle relative to the ground. In an effort to save space on the trailer when the ramps are stowed and save weight in the ramps, the ramps are made to a relative short length when compared to the length of the trailer. Short ramps have a fairly steep angle that makes loading and unloading a trailer difficult. Ideally, a gradually sloped ramp would be used, but longer ramps weigh more and take more space on the trailer when not being used.

SUMMARY OF THE INVENTION

The present invention is a suspension for a trailer or other vehicle that allows the trailer itself to be used as a ramp. The suspension has an axle having an axis and wheels for contacting a ground surface at each end of the axle. The axle is pivotally connected to the vehicle at a pivotal connection and the axis of the axle is offset from the pivotal connection to the vehicle. A rigid actuation device having a first and second end is pivotally connected to the axle at its first end. The actuation device is movable between a retracted length and extended length. Shifting the actuation device between its retracted and extended lengths causes the axle to pivot about the pivotal connection on the trailer, thereby changing the height of the vehicle relative to the ground surface.

The central axes of the wheels may be offset from the axis of the axle and below the pivotal connection on the vehicle.

The wheels may be connected to the axle through a resilient torsional connection.

In another aspect of the invention, the actuator is a hydraulic cylinder.

In another aspect of the invention, a lock may be included to prevent rotation of the axle.

In another aspect of the invention, a second axle may be included behind the first axle and the axles are connected with a connecting member so that movement of the first axle, causes movement of the second axle. In this configuration the pivotal connection of the actuator to the first axle may be closer radially to the pivot point than where the connecting member is pivotally connected to the first axle. In this case, the second axle will be caused to rotate more than the first axle when the actuator is moved from its retracted to its extended length.

BRIEF DESCRIPTION OF THE DRAWINGS

FIG. 4A is a perspective view showing the locking mechanism on the trailer of shown in FIG. 4 in its locked position;

FIG. 4B is a perspective view showing the locking mechanism on the trailer shown in FIG. 4 in its unlocked position;

DETAILED DESCRIPTION OF INVENTION

Figure 1:
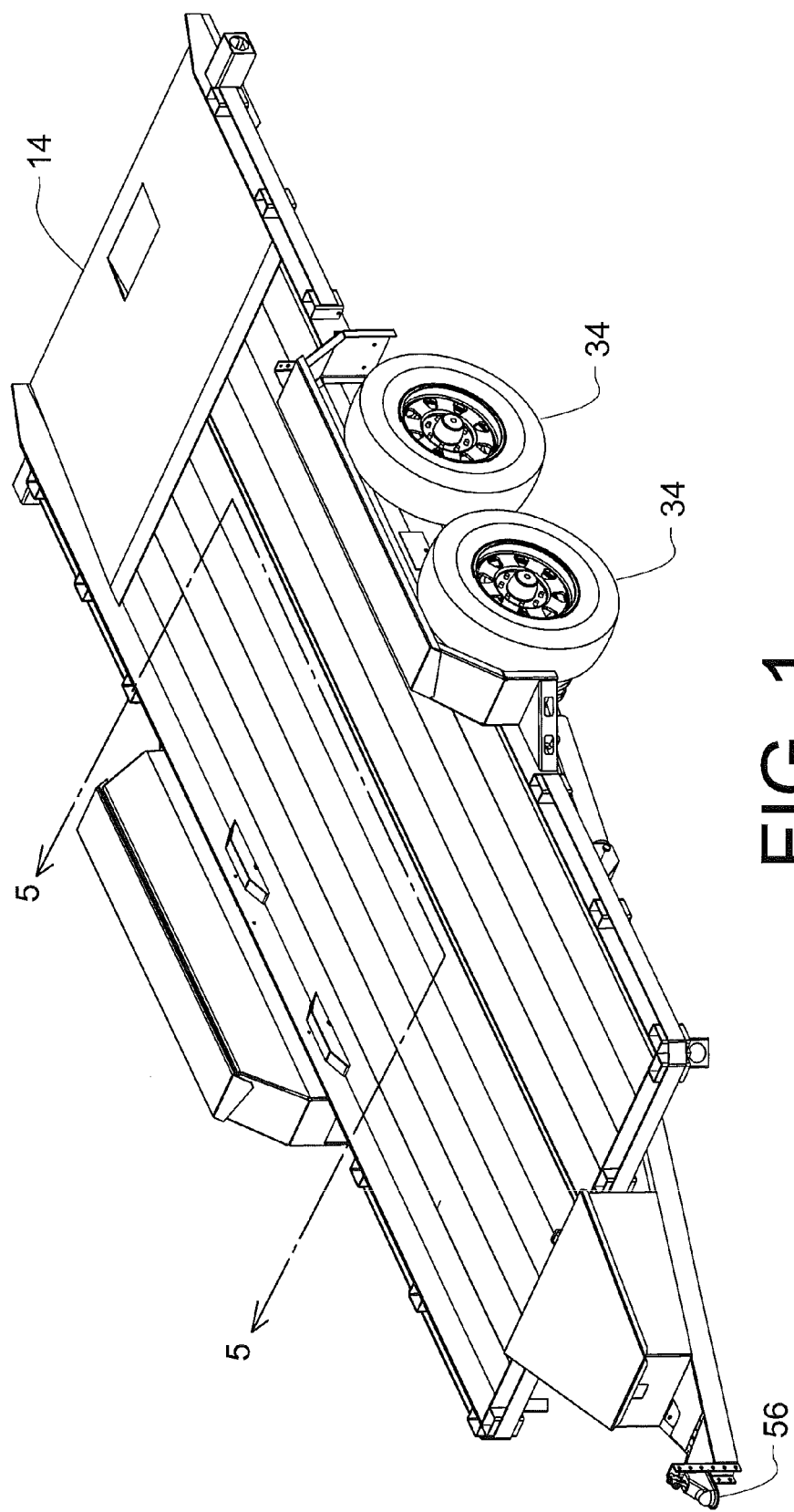
FIG. 1 is a perspective view showing the top of a double axle embodiment of the invention.
Figure 2:
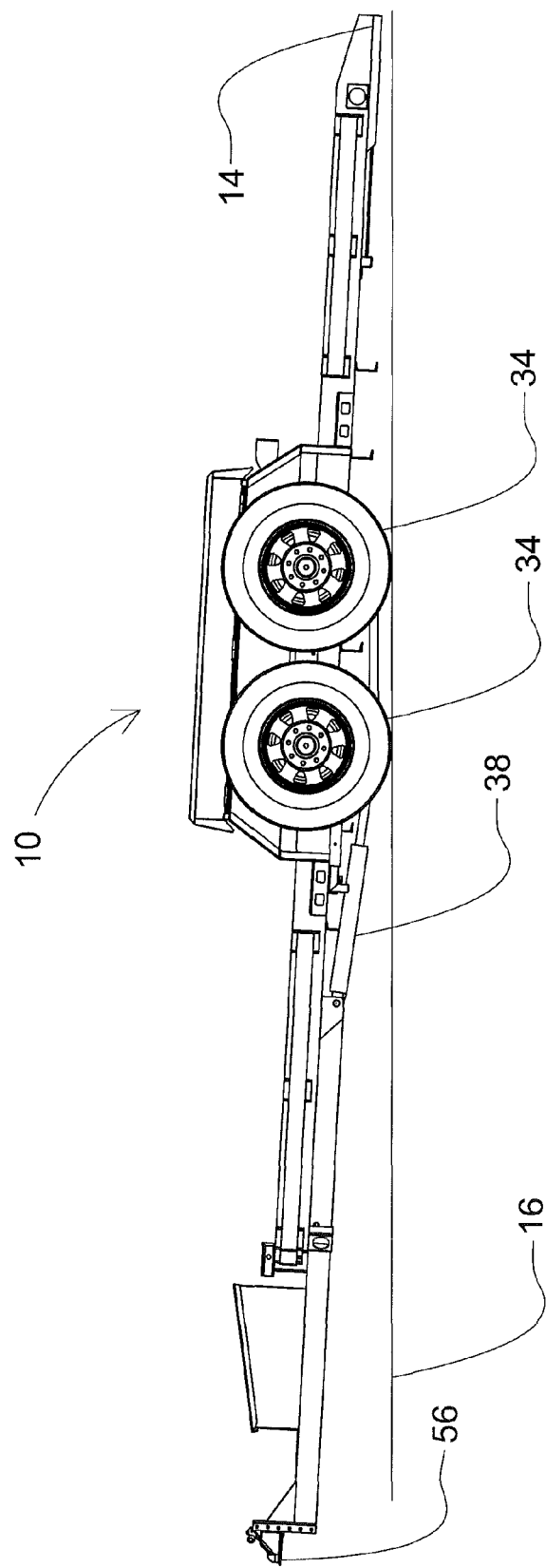
FIG. 2 is a side view of the trailer shown in FIG. 1 in its lowered position.
Figure 3:
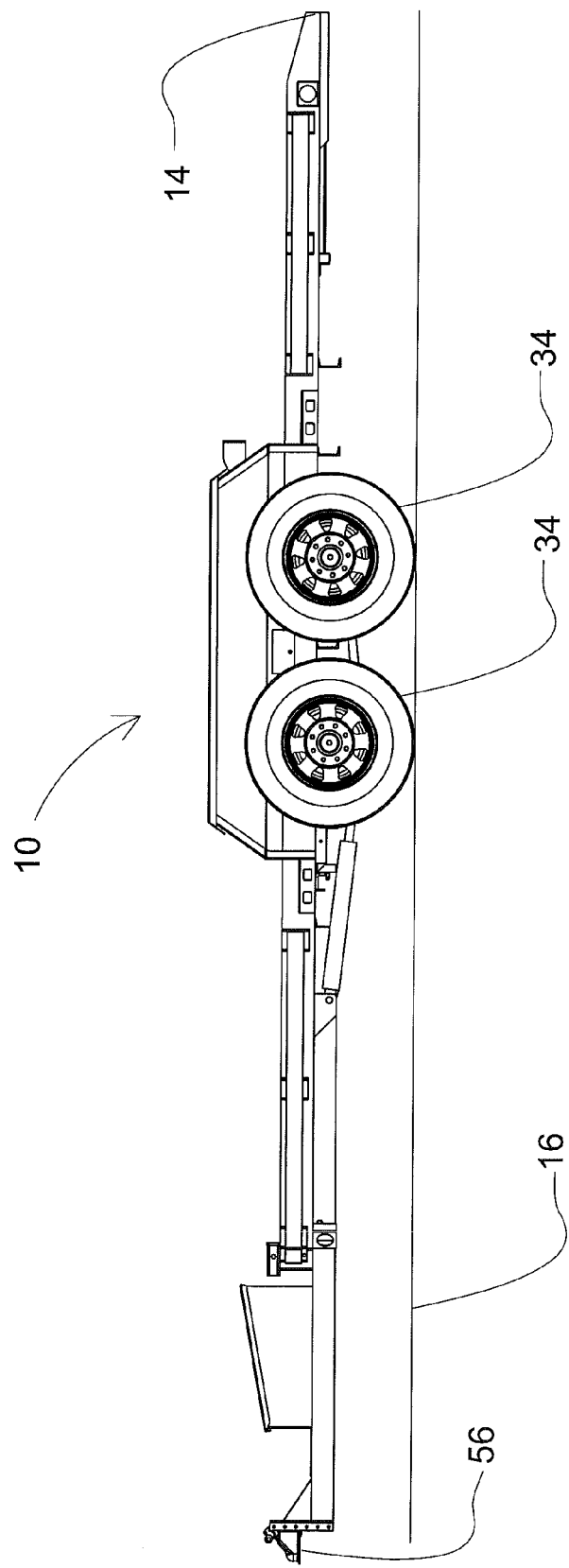
FIG. 3 is a side view of the trailer shown in FIGS. 1-2 in its raised position.

The present invention is related to a trailer 10 that may have its rearmost portion lowered so that the trailer 10 is inclined, thus eliminating the need for a separate ramp. The suspension 12 of the trailer allows the rear edge 14 of the trailer to be lowered to the ground 16. The lowered position of the trailer 10 is shown in FIG. 2. The trailer 10 may be made in a two axle version, or a single axle version 10'. Although it is not shown in the figures, it is contemplated that an enclosed box style trailer may be constructed according to the present invention.

Figure 4:
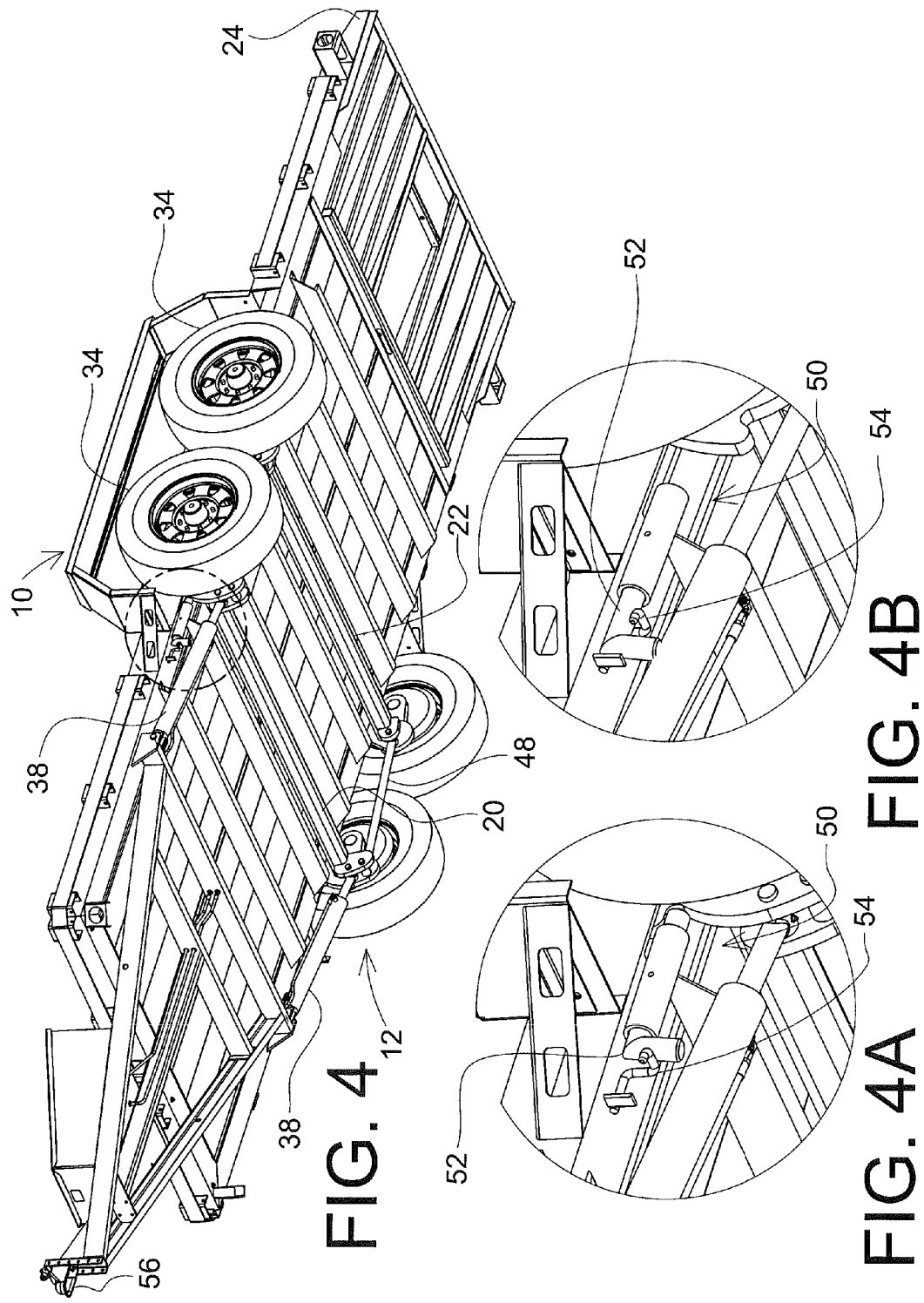
FIG. 4 is a perspective view of the trailer shown in FIGS. 1-3 showing the underbody and suspension components.

FIG. 4 shows a perspective view of the suspension 12 as viewed from underneath the trailer 10. The suspension 12 has a first, front axle 20 and a second, rear axle 22 that is located rearward of the first axle. Each axle 20, 22 has a connecting plate 24 that is pivotally connected to the trailer 10 about a pivot pin 26. The front connecting plate 24' has a notch 28 in a forward facing direction. The connecting plates 24, are welded to the axles 20, 22. The axles 20, 22 each include a torsion assembly 30 that provides a resilient torsional connection to an arm 32 to which wheels 34 are mounted so that the axes of the wheels 34 are offset from the axis of the corresponding axle 20, 22 to which the wheels 34 are attached. Since the arms 32 are all the same length, the axes of the wheels on opposite sides of each axle are aligned. The torsional assembly 30 is well known in the suspension art for absorbing shock from traveling over an uneven surface and is commonly used in trailer suspensions.

A hydraulic cylinder 38 that acts as a rigid actuator has a first end 40 and a second end 42. The hydraulic cylinder 38 is capable of shifting between an extended position shown in FIG. 6 and a retracted position shown in FIG. 5. The first end 40 of the hydraulic cylinder 38 is pivotally connected to the first axle 20 at a pin 44 held between the connecting plate 24' and an inner connecting plate 46. The axis of the pin 44 is a first radial distance D1 away from the axis of pivot pin 26. Each side of the trailer 10 is configured in the same manner, each having a hydraulic cylinder 38. FIG. 4 shows this. The second end 42 of the hydraulic cylinders 38 are pivotally connected to the trailer 10. An end of a tie rod 48 is pivotally held by pin 49 between connecting plates 24' and 46 at a radial distance D2 that is greater than D1.

Figure 5:
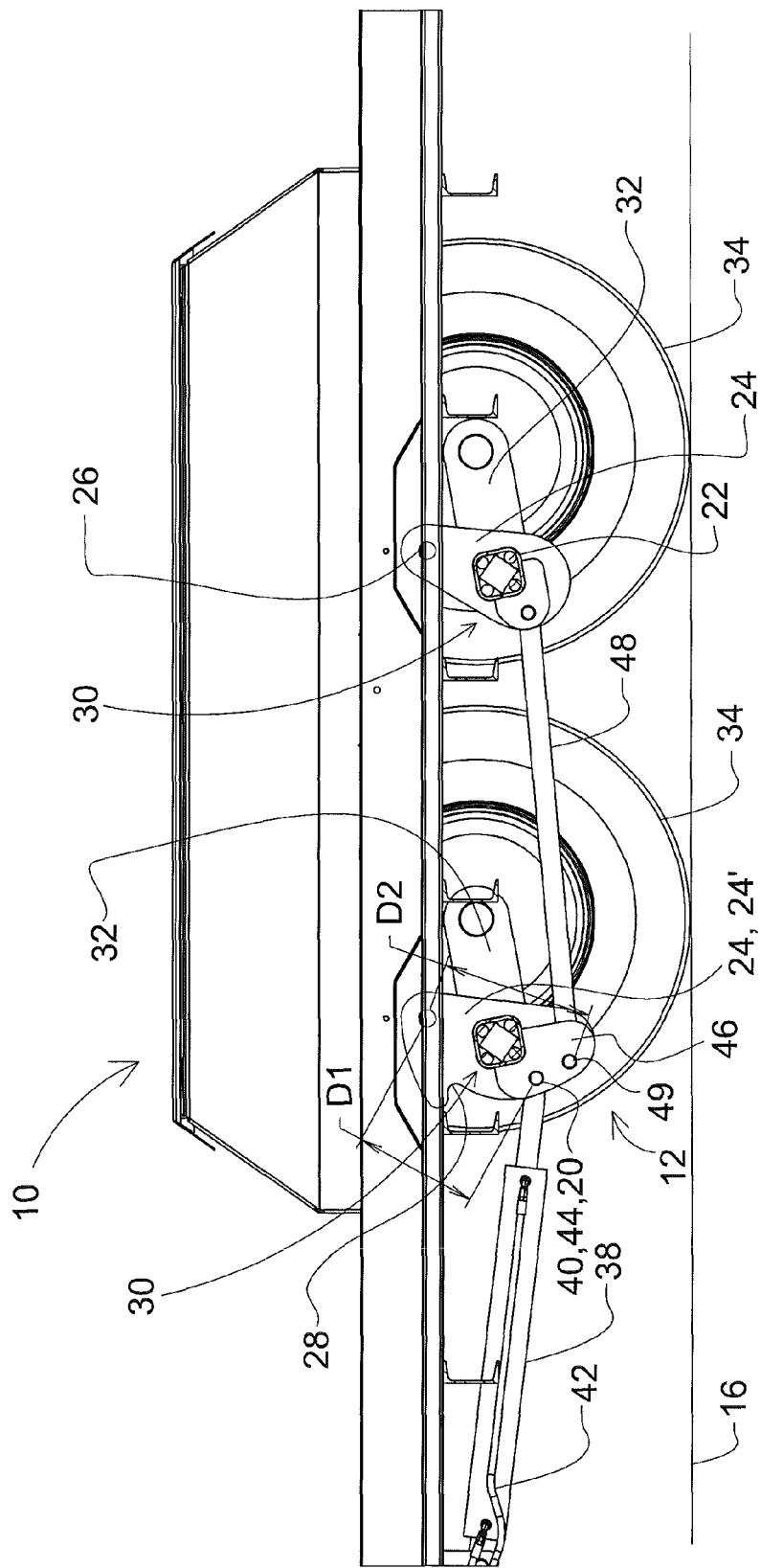
FIG. 5 is a side sectional view taken about the line 5-5 in FIG. 1, showing the suspension components in their positions corresponding to the raised position of the trailer.

When the trailer 10 is being driven down a road, the hydraulic cylinder 38 is in its retracted position as shown in FIG. 5. The retracted position of the hydraulic cylinder 38 corresponds to the raised position of the trailer 10. In this position, the force exerted on the wheels 34 tends to rotate the axles 20, 22 in a counterclockwise direction as viewed in FIG. 5. This is because the wheels 34 are located behind the pivot pin 26. Thus, in the absence of the hydraulic cylinder 38, the connecting plates 24, 24' tend to rotate counterclockwise as viewed in FIGS. 5 and 6. In case of failure of the hydraulic cylinder 38, a safety lock 50 is attached to the trailer 10. The safety lock has a bolt 52 that is slidable between a locked position shown in FIG. 4A and an unlocked position shown in FIG. 4B. When the bolt 52 is in its locked position, it rests against a stop 54. As such, movement of the connecting plate 24' is prevented. The connecting plate 24 on the rear axle 22 is also prevented from rotating through the connection of the tie rod 48.

Figure 6:
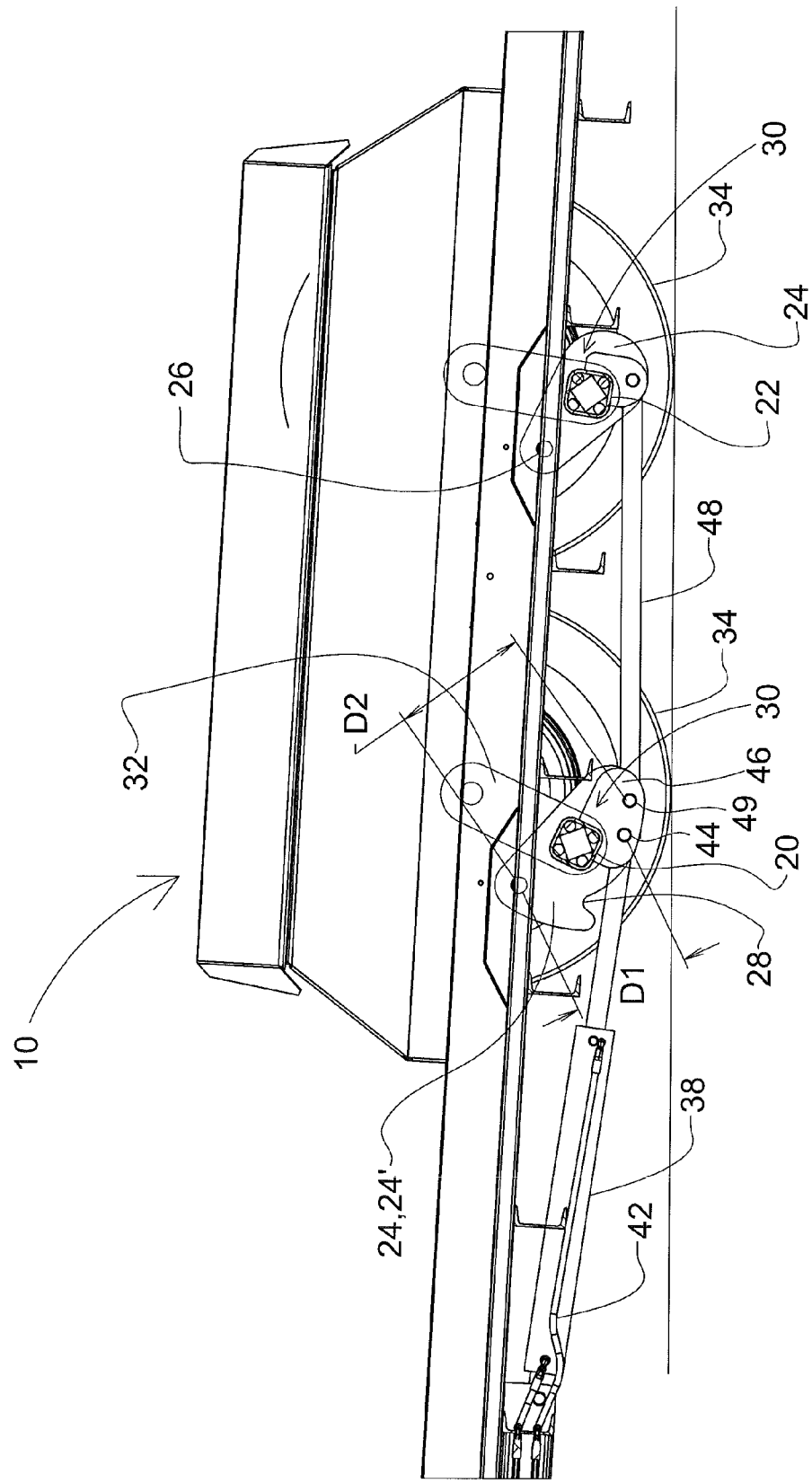
FIG. 6 is a side sectional view taken about the line 5-5 in FIG. 1, showing the suspension components in their positions corresponding to the lowered position of the trailer.
Figure 7:
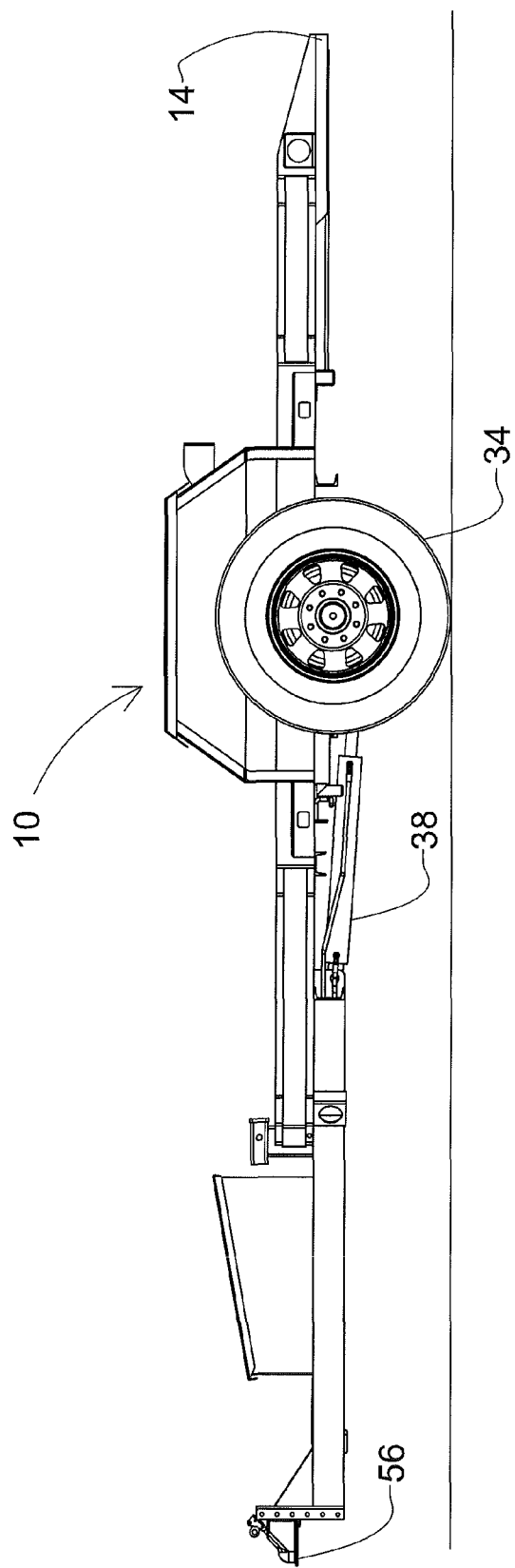
FIG. 7 is a side view of a single axle embodiment of the invention.
Figure 8:
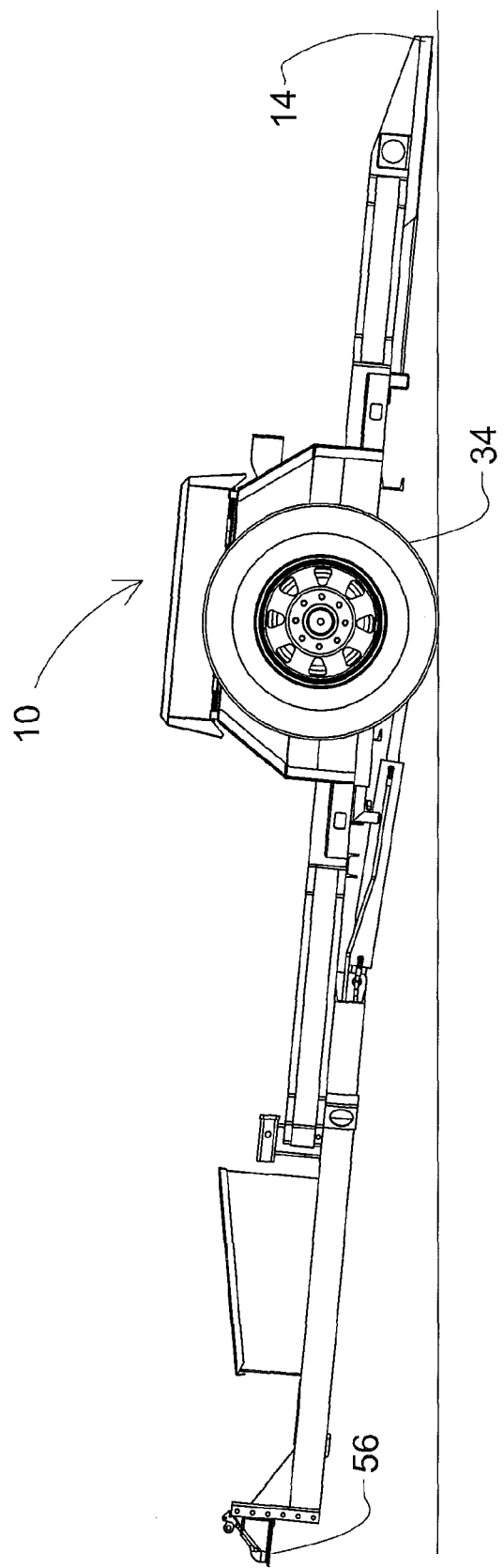
FIG. 8 is a side view of the trailer shown in FIG. 7 in its lowered position.
Figure 9:
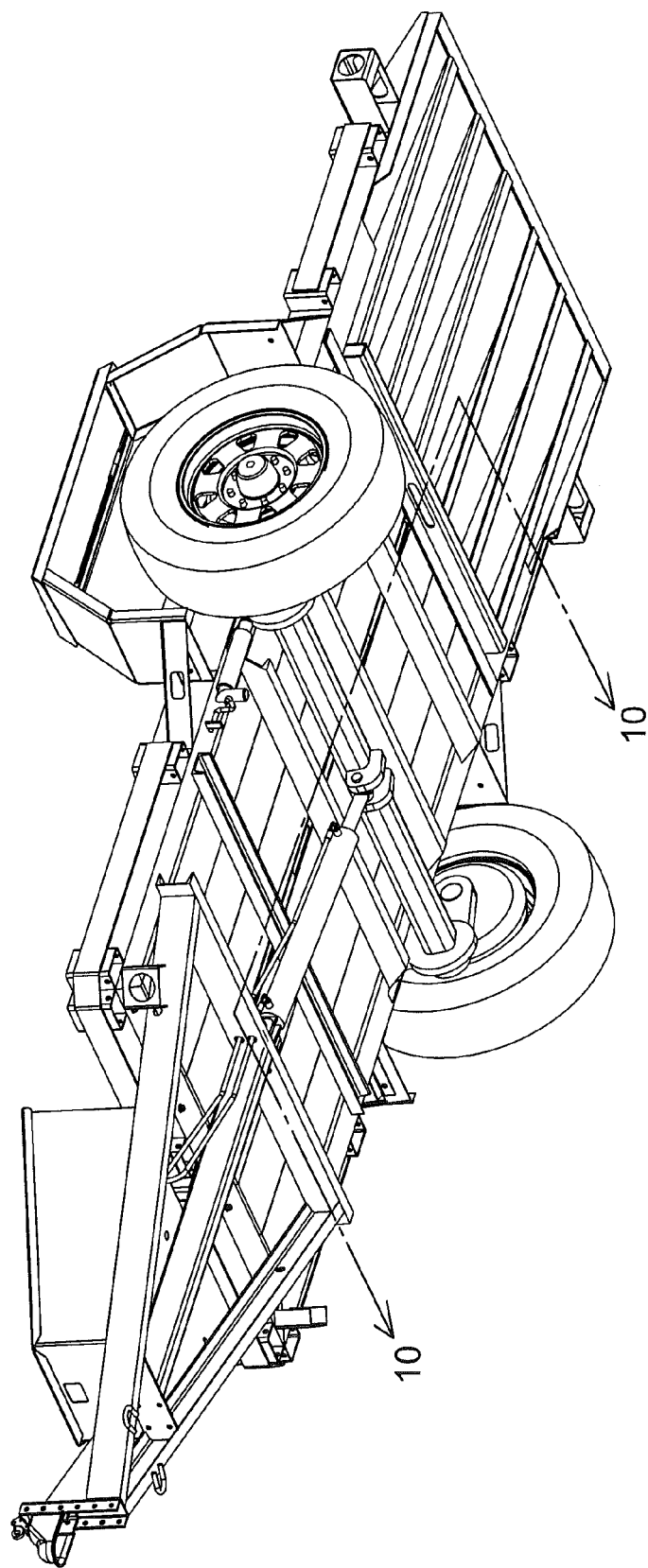
FIG. 9 is a perspective view of the trailer shown in FIGS. 7 and 8 showing the underbody and suspension components.
Figure 10:
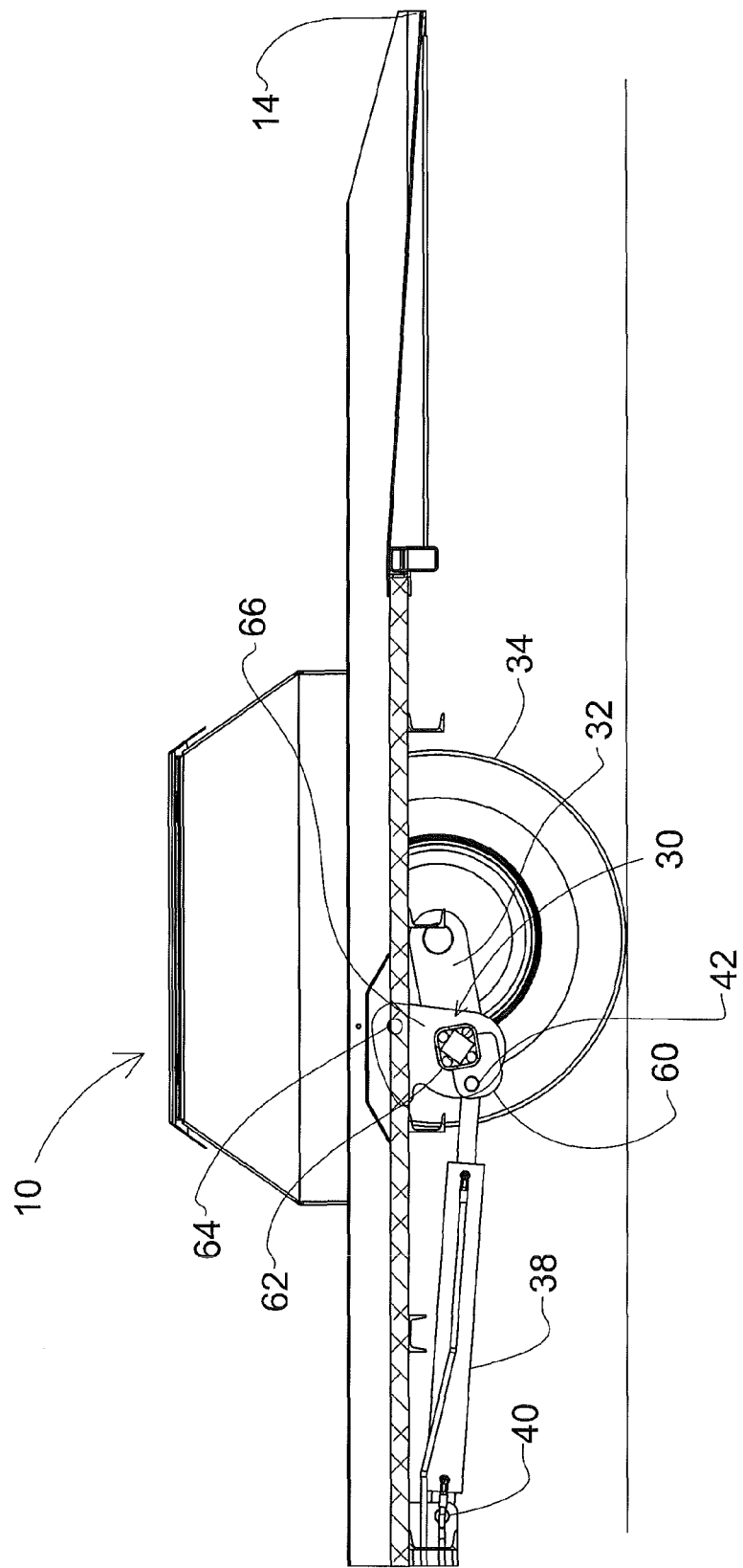
FIG. 10 is a sectional view of the trailer in its raised position taken about the line 10-10 in FIG. 9.
Figure 11:
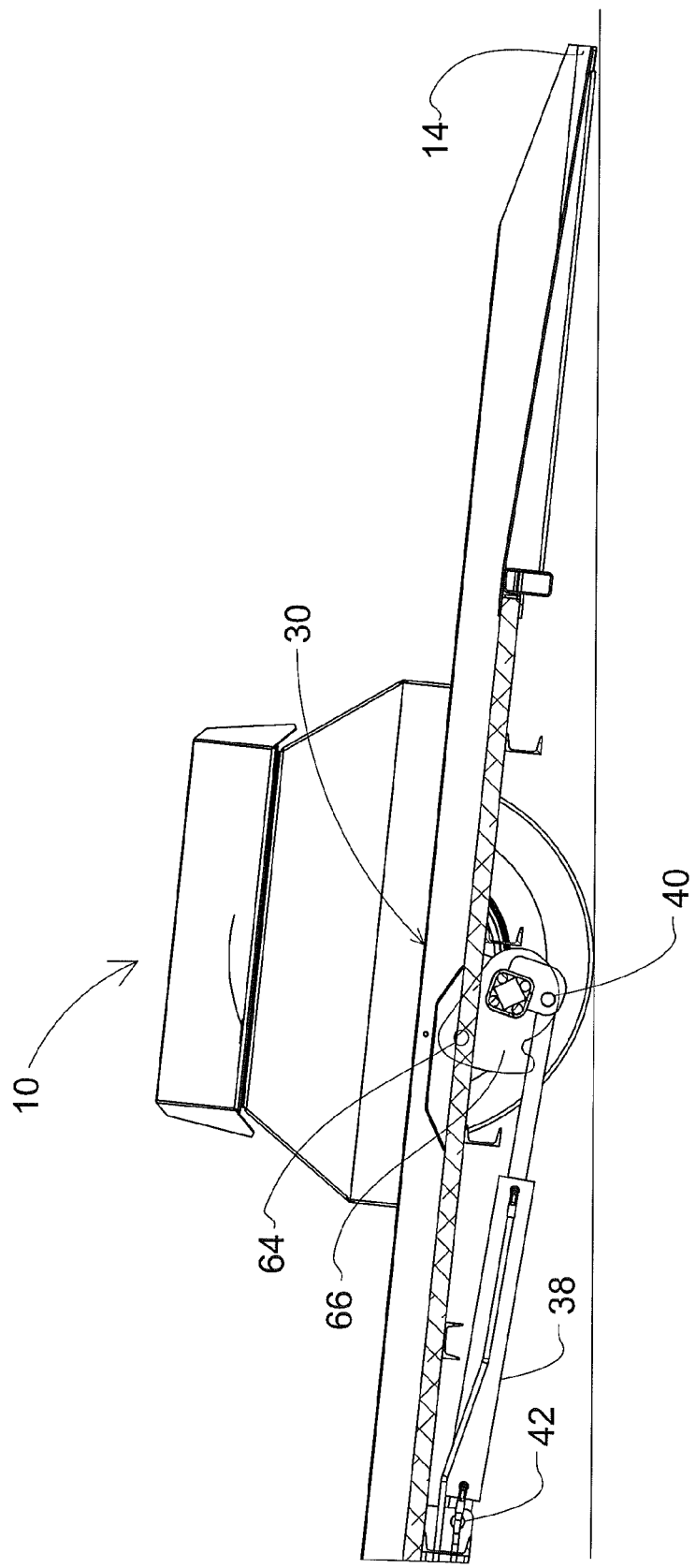
FIG. 11 is a sectional view of the trailer in its lowered position taken about the line 10-10 in FIG. 9.

The lowered position of the trailer 10 is shown in FIGS. 2 and 6. In the lowered position, the bolt 52 is moved ahead of the front stop 54. The hydraulic cylinder 38 is extended into its extended position shown in FIG. 5, which rotates the connecting plates 24, 24'. This action pivots the axles 20, 22 relative to the trailer so that the wheels 34 are rotated upward relative to the trailer 10, thus lowering the trailer. As can be seen in FIG. 2, the angle of the trailer forms a ramp with the ground 16 and is a gentle slope from the hitch 56 to the rear edge 14 of the trailer 10. As a consequence of geometry, the rear wheels 34 of the trailer must be raised more than the front wheels 34 of the trailer 10. This is because the bottom of the trailer is progressively nearer the ground 16 near the rear edge 14. Thus, the wheels 34 must be pivotally retracted at different rates. This is accomplished by the relative locations where the pivot pin 44 attaches to the connecting plate 24' with respect to the pivot pin 26 and where the pivot pin 49 attaches to the connecting plate 24' with respect to the pivot pin 26. Because the distance D1 between where the hydraulic cylinder 38 attaches to the connecting plate 24' is shorter than distance D2 where the tie rod 48 connects to the connecting plate 24', movement of the hydraulic cylinder 38 will cause greater movement in the tie rod 48. As the tie rod 48 moves more than the hydraulic cylinder, the rear axle 22 will be rotated more than the front axle 20. The greater rotation in the rear axle 22 raises the rear wheels 34 more than the front wheels 34. Thus, all of the wheels 34 contact the ground 16 when the trailer 10 is in its raised and lowered positions.

Although gravity will tend to rotate the axles 20, 22 into the position shown in FIG. 6, having rigid actuating mechanisms is important. The fact that the hydraulic cylinder 38 and tie rod 48 are rigid means that the suspension 12 does not need to rely on gravity to shift from the raised position to the lowered position. In prior art designs, gravity was relied upon to rotate axles. In the present invention, the hydraulic cylinder 38 rotates the axles. Because the hydraulic cylinder 38 is a dual acting cylinder, it can exert force as it retracts and extends. When the hydraulic cylinder pushes toward its extended position, the trailer 10 is moved to its lowered position shown in FIG. 6. When the hydraulic cylinder pulls, or retracts, the trailer is raised into the position shown in FIG. 5. A benefit of not relying on gravity to rotate the axles 20, 22 of the present invention is that the center of the wheels 34 can be located forward of the pivot pin 26 and the trailer will still function. In the prior art, wheels had to be placed substantially behind the pivotal location on the trailer to generate the moment needed to turn the axles.

A single axle version of the suspension 12' is shown in FIGS. 7-11. This version of the suspension 12' functions in much the same way as the two axle version, the main difference being the lack of a second axle. In the single axle version, the connecting plates 60 are welded in a central location on the axle 62 to receive the end 42 of a single hydraulic cylinder 38. The axle 62 pivots about pivot pins 64 on the trailer 10'. The pins extend through outer plates 66 near the ends of the axle 62. When the hydraulic cylinder 38 is extended, the trailer 10' will be in its lowered position shown in FIGS. 8 and 11. When the hydraulic cylinder is in its retracted position, the trailer 10' will be in its raised position shown in FIGS. 7 and 10. The single axle version also has a safety lock 50 that functions in the same manner as the double axle version of the suspension 12.

When the user of the trailer 10, 10' wishes to lower the trailer, he will first unlock the lock 50. Then he will use controls operatively connected to the hydraulic cylinder(s) 38 to extend the cylinder(s) 38. This will lower the trailer 10, 10' in a gradual angle that gently slopes from the hitch 56 to the rear edge 14. Using the length of the entire trailer 10, 10' to act as the ramp saves the space taken by separate ramps as well as providing a more gradual angle than separate ramps that are shorter than the trailer 10, 10' could provide. When the user wishes to raise the trailer, he will retract the hydraulic cylinder(s) 38. This will put the trailer 10, 10' in the raised position for traveling. Once the trailer 10, 10' is in the raised position, the lock 50 will be put in to the locked position shown in FIG. 4A.

The invention is not limited to the details given above, but may be modified within the scope of the following claims.

What is claimed is:

1. A suspension for a vehicle having:
   a first wheel for contacting a ground surface rotatively mounted to a first connecting member, said first connecting member being pivotally connected to said vehicle about a first pivot point;
   a second wheel for contacting a ground surface rotatively mounted to a second connecting member, said second connecting member being pivotally connected to said vehicle about a second pivot point;
   an actuating member being movable between an extended and retracted position, said actuating member pivotally connected to said vehicle at a third pivot point that is fixed to said vehicle, said actuating member being connected to said first connecting member at a fourth pivot point; and
   a linkage pivotally connected at a fifth pivot point that is fixed with respect to said fourth pivot point on said first connecting member, said fifth pivot point located radially farther from said first pivot point than said fourth pivot point, and said linkage pivotally connected to said second connecting member at a sixth pivot point.

2. The vehicle suspension as claimed in claim 1, wherein said wheels are connected to said connecting members through a resilient torsional connection.

3. The vehicle suspension as claimed in claim 2, wherein said wheels have central axes being located below said first and second pivot points.

4. The vehicle suspension as claimed in claim 1, wherein said actuating member is a hydraulic cylinder.

5. The vehicle suspension as claimed in claim 1, wherein one of said connecting members includes a locking mechanism to prevent pivoting of said connecting members.

6. The vehicle suspension as claimed in claim 5, wherein said locking device includes a notch in one of said connecting members, and a bolt being slidable relative to said vehicle, said one connecting member being restrained from movement when said bolt is located within said notch in said one connecting member.

7. The vehicle suspension as claimed in claim 1, wherein said suspension includes torsion axles each having a resilient pivotal connection being fixed to said connecting members, each said torsion axle including an arm extending from said resilient pivotal connection, said wheels being mounted to said arms.

* * * * *